United States Patent [19]
Williamson

[11] Patent Number: 5,887,295
[45] Date of Patent: Mar. 30, 1999

[54] FIBER OPTICS COUPLER FOR A SWIMMING POOL COPING

[75] Inventor: James Michael Williamson, Fort Wayne, Ind.

[73] Assignee: Fort Wayne Plastics, Inc., Fort Wayne, Ind.

[21] Appl. No.: 911,530

[22] Filed: Aug. 14, 1997

[51] Int. Cl.$^6$ .................................................. E04H 4/00
[52] U.S. Cl. ........................................................ 4/496
[58] Field of Search ................................ 4/496, 506

[56] References Cited

U.S. PATENT DOCUMENTS

| | | | |
|---|---|---|---|
| 4,064,571 | 12/1977 | Phipps | 4/172.19 |
| 4,107,826 | 8/1978 | Tysdal | 24/243 |
| 4,457,119 | 7/1984 | Dahowski | 52/300 |
| 4,901,492 | 2/1990 | Coates | 52/300 |
| 5,107,551 | 4/1992 | Weir et al. | 4/496 |
| 5,134,819 | 8/1992 | Boyack | 52/169.7 |
| 5,170,517 | 12/1992 | Stegmeier | 4/496 |
| 5,680,730 | 10/1997 | Epple | 4/496 X |

*Primary Examiner*—Charles E. Phillips
*Attorney, Agent, or Firm*—Taylor & Associates, P.C.

[57] ABSTRACT

A coping assembly for use in a swimming pool includes a coping having a longitudinal direction. The coping also has a base with a device for connecting to a sidewall of the pool, a facia connected to the base with a slot extending substantially parallel to the longitudinal direction, a back wall, and a first through hole extending through the coping from the back wall to the slot. The coping assembly also includes a coupler having a body with a front section. The front section substantially conforms to and is engaged with the back wall of the coping. The coupler has a second through hole extending through the body to the front section. The second through hole is aligned with the first through hole in the coping. The coping assembly further includes a tube light extending through each of the through holes and disposed within the slot.

14 Claims, 2 Drawing Sheets

FIBER OPTICS COUPLER FOR A SWIMMING POOL COPING

BACKGROUND OF THE INVENTION

1. Field of the invention.

The present invention relates to a coping assembly for a swimming pool, and, more particularly, to a coping assembly for a swimming pool including a tube light.

2. Description of the related art.

A coping for a swimming pool is disposed about the periphery of the pool and above water level. It is common for a coping to interconnect the sidewalls, pool liner and walkway of the pool. For example, a coping may include a bottom surface which is adapted for connection to a sidewall of the pool using appropriate fasteners, and a facia having a slot extending the longitudinal length thereof which receives a bead disposed at the top edge of the liner. The back of the coping, disposed opposite the facia, is adapted to receive and interconnect with concrete forming the walkway.

It is known to provide a light which is associated with a coping. The light provides increased aesthetic appeal to actual and prospective purchasers. The light can be configured, e.g., as a fiber optic or light emitting diode (LED) light source. For example, it is known to provide a coping which is formed as a multiple-piece coping having a bead slot for receiving a liner bead, and an additional oval slot for receiving a fiber optic strip light. The strip light consists of a transparent plastic sheathing which is disposed in the oval slot of the coping, and a plurality of fibers which are disposed within the sheathing. The two ends of the strip light lead out of the slot at the facia of the coping and extend over the top of the coping. From this point, the ends lead to and connect with a remote light source or power source.

Another type of conventional light source for use with copings is in the form of a transparent plastic lighted tube having a flange extending therefrom which is received in the liner bead slot. The light is installed by hammering or otherwise inserting the flange into the liner bead slot after the liner bead is installed and the pool is filled with water. The installer typically bends over the side of the pool from the walkway to install the flange of the light into the liner bead slot, thus making the installation difficult. One or two ends of the tube light must be left extending out of the slot so that they can be connected to a light source or power source. The installer arranges the tube light ends along the least obtrusive path available from the liner bead slot to the light source or power source. Some portion of this path will include areas where the tube light is likely to be damaged or present a tripping hazard to people around the pool. For example, the tube light will cross the top of the coping and possibly a horizontal walking area surrounding the swimming pool. In general, the plastic tube, which is disposed adjacent to, rather than in the coping, is susceptible to damage from mechanical impact. Further, the tube light is also aesthetically unappealing when it is visible outside of the coping.

What is needed in the art is a coping assembly which allows a tube light to extend from a power source or light source and be received within a slot of the coping without the tube light being exposed to mechanical damage, presenting a tripping hazard to people around the swimming pool, or being visible outside of the coping.

SUMMARY OF THE INVENTION

The present invention provides a coping assembly for a swimming pool which includes an enclosed path through which a tube light can extend from a power source or light source to a slot of the coping without the tube light being exposed to mechanical damage, presenting a tripping hazard to people around the swimming pool, or being exposed visually outside of the coping.

The invention comprises, in one form thereof, a coping having a longitudinal direction. The coping also has a base with a device for connecting to a sidewall of the pool, a facia connected to the base with a slot extending substantially parallel to the longitudinal direction, a back wall, and a first through hole extending through the coping from the back wall to the slot. The coping assembly also includes a coupler having a body with a front section. The front section substantially conforms to and is engaged with the back wall of the coping. The coupler has a second through hole extending through the body to the front section. The second through hole is aligned with the first through hole in the coping. The coping assembly further includes a tube light extending through each of the through holes and disposed within the slot.

An advantage of the present invention is that the tube light is protected from mechanical impact along its path from the light source or power source to the slot of the swimming pool coping.

Another advantage of the present invention is that the tube light does not present a tripping hazard to people around the swimming pool.

A further advantage is that the tube light is not exposed visually outside of the swimming pool coping, creating a more aesthetically pleasing display.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
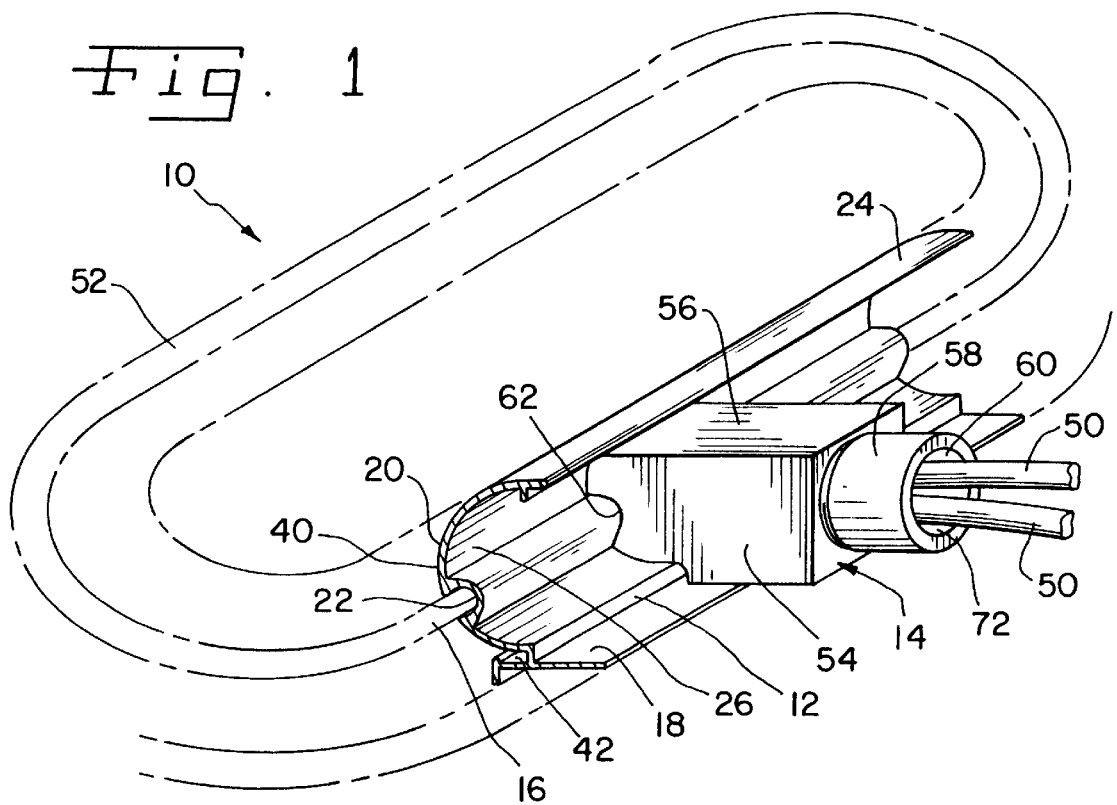
FIG. 1 is a rear, perspective view of one embodiment of a fiber optics coupler for a swimming pool coping of the present invention.

Referring now to the drawings, and more particularly to FIG. 1, there is shown an embodiment of a coping assembly 10 of the present invention for use in a swimming pool (not shown). Coping assembly 10 generally includes a coping 12, coupler 14 and tube light 16. Coping 12 includes multiple pieces which are laid end-to-end such that coping 12 and tube light 16 extend around the entire periphery of the pool, forming complete loops (indicated in phantom lines in FIG. 1).

Coping 12 includes a base 18, front wall 20, light receiving slot 22, top 24, back wall 26 and first through hole 28

Figure 3:
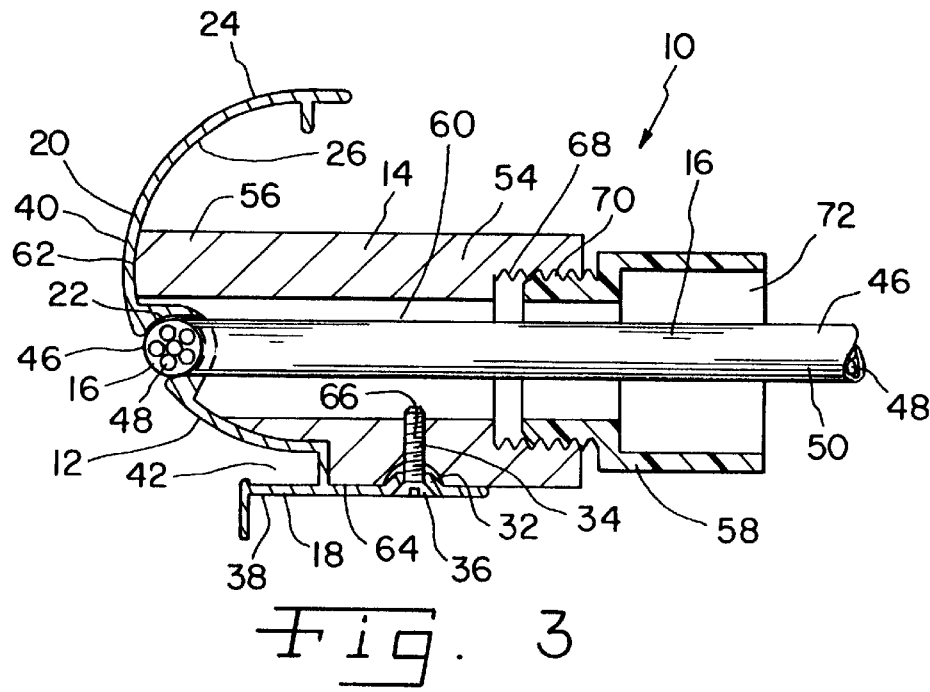
FIG. 3 is a side, sectional view of the fiber optics coupler of FIG. 1.
Figure 4:
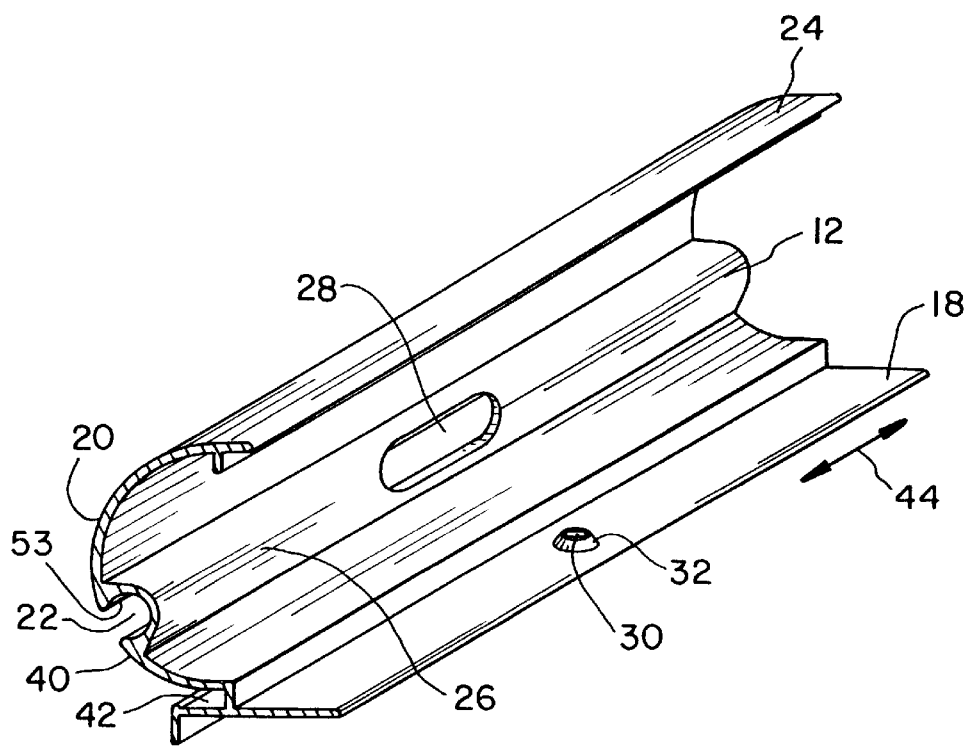
FIG. 4 is a rear, perspective view of the coping of FIG. 1.

(FIG. 4). Base 18 is suitably configured for connecting to a sidewall of the pool. In the embodiment shown, base 18 is configured as a flange which may be bolted or otherwise attached to the top of the sidewall of the pool. Base 18 includes a first screw through hole 30 having a protruding exit or recessed entry 32 through which a screw 34 (FIGS. 2 and 3) can attach coping 12 to coupler 14. A head 36 of screw 34 can be countersunk into recessed entry 32 of first screw through hole 30 so that head 36 does not project into the plane of a bottom face 38 of base 18. In this way, bottom face 38 of base 18 is kept planar so that it can rest stably flat on the top of the sidewall of the pool.

Front wall 20 is connected to base 18 and includes top 24 and a facia 40. Facia 40 generally faces toward the inside of the swimming pool when assembled. Facia 40 has a first slot or light receiving slot 22 for receiving and retaining a light source therein, such as a tube light 16. Facia 40 also has a second slot or liner bead receiving slot 42 for receiving and retaining a liner bead (not shown) therein. Each of liner bead receiving slot 42 and light receiving slot 22 extend substantially parallel to a longitudinal direction (indicated by direction arrow 44 in FIG. 4) of coping 12.

Tube light 16 is a fiber optic tube light including a sheathing 46 having a plurality of fibers 48 disposed therein. Fibers 48 within both ends 50 of tube light 16 receive light from a light source (not shown), which may be remotely located. Fibers 48 may be illuminated with a single color of light, or may be illuminated with a plurality of colors of light, depending upon personal preferences. Tube light 16 forms a loop 52 around the pool which extends through each of coping 12 and coupler 14.

Light receiving slot 22 is disposed in the bottom half of convex facia 40 and is directed in a downwardly, angled position. Positioning light receiving slot 22 in the bottom half of facia 40 inhibits mechanical damage to tube light 16, and further inhibits direct exposure of tube light 16 to sunlight. Since sheathing 46 and/or fibers 48 are likely formed from a plastic material, inhibiting exposure thereof to direct sunlight results in decreased damage caused by UV radiation. Further, by directing light from tube light 16 in a downwardly, angled direction, the majority of illuminated light from tube light 16 is not lost to the ambient environment, but rather is reflected off of the water in the swimming pool, thereby resulting in an increased aesthetic appeal to prospective and actual purchasers. Finally, as can be appreciated from FIG. 3, light receiving slot 22 is positioned such that water drains therefrom and is not retained therein, thereby eliminating the possibility of freezing and expansion of water within light receiving slot 22.

Light receiving slot 22 preferably has a generally circular cross-section which is sized for receiving tube light 16 therein. It has been found that the circular cross-section provides easier installation of the light source into light receiving slot 16, as contrasted with light receiving slots having other cross-sections such as oval, etc. Further, the generally circular cross-section of light receiving slot 22 allows the use of a tube light 16 having a corresponding circular cross-section with an increased cross-sectional surface area as compared to conventional strip and tube lights used with other copings. This allows a greater number of fibers 48 to be disposed within sheathing 46, with a resultant increased light output.

Light receiving slot 22 has an inside surface 53 (FIG. 4) which may be configured with a high reflectivity to increase the light output therefrom. For example, if coping 12 is formed from aluminum, inside surface 53 may be configured as a bare aluminum surface with a relatively smooth surface finish (as would result from extrusion) and a corresponding high reflectivity. Alternatively, inside surface 53 can be painted or otherwise finished with a non-reflective surface.

Facia 40 has a curved or convex shape, but may be differently shaped. As will be appreciated, top 24 and base 18 are rigidly affixed to the walkway and side wall of the pool, respectively. The convex shape of facia 40, in conjunction with the presence of light receiving slot 22 in facia 40, allows for thermal expansion and contraction of wall 14 caused by the sun and/or light source disposed within light receiving slot 22. That is, since wall 20 is rigidly fixed at the top and bottom thereof, the convex shape of facia 40 allows for thermal expansion and contraction in a generally sideways direction, i.e., perpendicular to longitudinal direction 44.

First through hole 28, extending through coping 12 from light receiving slot 22 to back wall 26, provides a path through which both ends 50 of tube light 16 can pass from light receiving slot 22 to coupler 14. First through hole 28 has a substantially oval shape which allows two ends 50 of tube light 16 to enter light receiving slot 22 through opposite ends of the oval and proceed in opposite directions around the pool.

Figure 2:
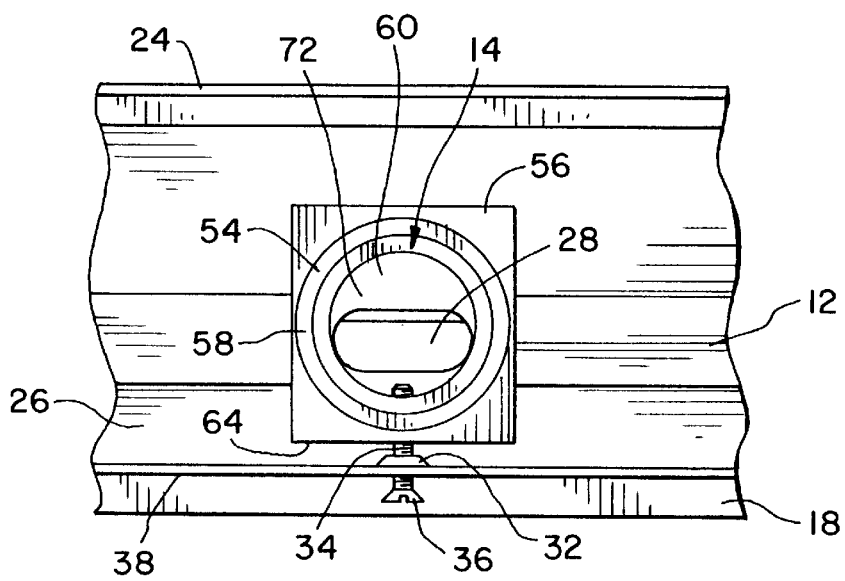
FIG. 2 is a rear, fragmentary view of the fiber optics coupler of FIG. 1.

Coupler 14 includes a body 54, having a front section 56 connected to a back section 58, and a second through hole 60 extending through both front section 56 and back section 58 of body 54. Second through hole 60 is aligned with first through hole 28 of coping 12 such that second through hole 60 extends perpendicularly with respect to the longitudinal direction of coping 12 (FIG. 2). The alignment of first through hole 28 and second through hole 60 provides a clear, enclosed path through which tube light ends 50 can pass from light receiving slot 22, through body 54 of coupler 14, to the tube light conduit (not shown).

Coupler 14 generally acts as an enclosed pathway through which tube light ends 50 can pass from the tube light conduit to light receiving slot 22. Coupler 14 substantially encapsulates tube light ends 50 such that they are protected from mechanical impacts and wear. In the route taken by tube light ends 50, i.e., through first through hole 28, such mechanical impacts would result, in the absence of coupler 14, from the weight and gripping force of the concrete (not shown) that is typically poured behind coping 12 and into which top 24 of coping 12 is anchored. If the poured concrete were allowed to harden around tube light ends 50, i.e., in the absence of coupler 14, tube light ends 50 would become immovably fixed within the poured concrete. The length of tube light 16 extending around the pool, or, on the other side of the concrete, extending to the tube light conduit, would thereafter not be adjustable. Also, if tube light 16 ever needed to be replaced, the concrete surrounding tube light 16 would have to be broken up to allow tube light removal. Further, the concrete would have to be repoured after replacement of tube light 16.

Front section 56 of coupler 14 has a front face 62 which substantially conforms to back wall 26 of coping 12 such that the poured concrete is not able to substantially penetrate between back wall 26 and front section 56 and possibly come into contact with tube light ends 50. The surface of front face 62 follows the contours of back wall 26. Front section 56 also has a flat bottom 64 which interfaces with and stably rests upon base 18 of coping 12. Flat bottom 64 includes a second screw hole 66 which is aligned with first screw through hole 30 of base 18 such that screw 34 can simultaneously pass through screw through hole 30 and screw into screw hole 66, thus interconnecting coping 12 with coupler 14. Second screw through hole 66 has a recessed entry for receiving protruding exit 32 of first screw through hole 30. The rear portion of front section 56 includes threads 68 within second through hole 60 for receiving back section 58. The outside of front section 56 is substantially rectangular in shape. However, it is to be understood that front section 56 can have any of various other possible shapes, e.g., trapezoidal.

Back section 58 of coupler body 54 includes projecting threads 70 (FIG. 3) which mate with the recessed threads of front section 56 such that back section 58 can be detached and reattached to front section 56. Alternatively, back section 58 can connect to front section 56 by any of a number of devices, e.g., back section 58 and front section 56 can have interlocking parts which lock and unlock via sections 56 and 58 being pressed together and rotated with respect to each other. Back section 58 has a cylindrical outside surface and a circular rear opening 72 for interfacing with the tube light conduit (not shown). As can be appreciated, however, back section 58 can be of any shape necessary to accommodate the particular shape of a tube light conduit.

In the embodiment shown, coping 12 is of a monolithic, metal construction and is formed by the process of extrusion. Coping 12 may thus be relatively easily fabricated. It is to be understood, however, that coping 12 could be formed by processes, such as molding, etc.

Also, in the embodiment shown, tube light 16 is a fiber optic tube light. However, it is to be understood that other light sources can be utilized, e.g., LED tube light, etc. Further, in the embodiment shown, both ends 50 of tube light 16 are connected to a light source or power source. It is to be understood, however, that it is also possible to only connect one end 50 of tube light 16 to a light source or power source.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A coping assembly for use in a swimming pool, the coping assembly comprising:

a coping including a longitudinal direction, a base including means for connecting to a sidewall of the pool, a facia connected to said base and having a slot extending substantially parallel to said longitudinal direction, said coping further including a back wall and a first through hole extending through said coping from said back wall to said slot;

a coupler including a body having a front section, said front section substantially conforming to and in engagement with said back wall of said coping, said coupler including a second through hole extending through said body to said front section, said second through hole being aligned with said first through hole in said coping; and a tube light extending through each of said first through hole and said second through hole and disposed within said slot.

2. The coping assembly of claim 1, wherein said tube light includes two ends, each of said two ends extending through each of said through holes.

3. The coping assembly of claim 1, wherein said coupler includes a back section for attaching to a tube light conduit.

4. The coping assembly of claim 3, wherein said back section is detachable from said front section.

5. The coping assembly of claim 4, wherein said back section includes means for attaching to said front section.

6. The coping assembly of claim 5, wherein said attaching means includes threads on said back section.

7. The coping assembly of claim 1, wherein said coupler is configured for substantially encapsulating said tube light between said coping and a tube light conduit.

8. The coping assembly of claim 1, wherein said front section of said coupler is substantially rectangular in shape.

9. The coping assembly of claim 1, wherein said coping includes a first screw through hole, said coupler including a screw hole aligned with said first screw through hole of said coping, said coping assembly further comprising a screw extending through said first screw through hole of said coping and into said screw hole of said coupler.

10. The coping assembly of claim 1, wherein said tube light comprises a loop having opposite ends extending through each of said through holes.

11. The coping assembly of claim 1, wherein each of said coping and said tube light extend around the pool.

12. The coping assembly of claim 1, wherein said coping includes a second slot for receiving and retaining a liner bead therein, said second slot extending substantially parallel to said longitudinal direction.

13. A coping assembly for use in a swimming pool, said coping assembly comprising:

a coping including a back wall and a slot for receiving and retaining a tube light therein, said coping further including a first through hole for threading at least one tube light therethrough; and a coupler including a body having a front section, said front section substantially conforming to and in engagement with at least a portion of said back wall of said coping, said coupler including a second through hole located in a portion that is in engagement with said coping for threading at least one tube light therethrough, said second through hole being aligned with said first through hole.

14. A coping assembly for use in a swimming pool, the coping assembly comprising:

a coping including a longitudinal direction, a base including means for connecting to a sidewall of the pool, a facia connected to said base and having a slot extending substantially parallel to said longitudinal direction, said coping further including a back wall and a first through hole extending through said coping from said back wall to said slot; and a coupler including a body having a front section, said front section substantially conforming to and in engagement with said back wall of said coping, said coupler including a second through hole located in a portion that is in engagement with said coping extending through said body to said front section, said second through hole being in communication with said first through hole in said coping.

* * * * *